March 10, 1931.  E. J. S. SWANSON  1,796,063
CONDUIT FITTING
Filed Aug. 7, 1926    2 Sheets-Sheet 1

Elmer J. S. Swanson
INVENTOR.

BY
ATTORNEYS.

March 10, 1931.  E. J. S. SWANSON  1,796,063
CONDUIT FITTING
Filed Aug. 7, 1926    2 Sheets-Sheet 2
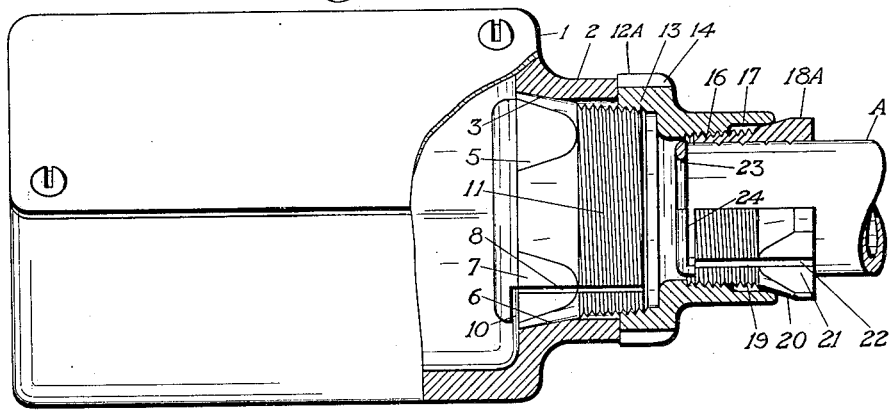
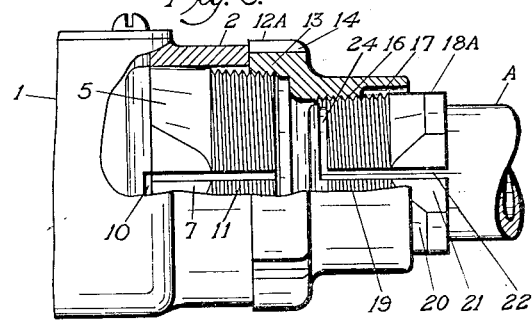
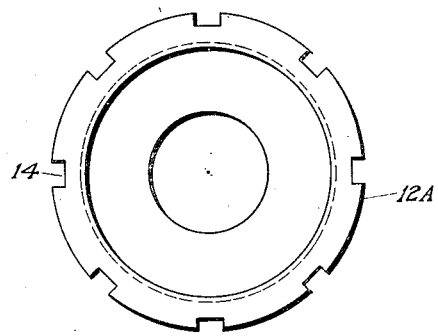
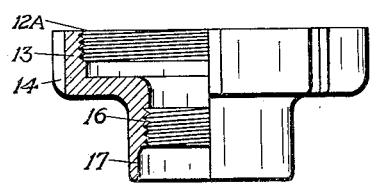
Elmer J. S. Swanson
INVENTOR.
BY
ATTORNEYS.

Patented Mar. 10, 1931

1,796,063

UNITED STATES PATENT OFFICE

ELMER J. S. SWANSON, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed August 7, 1926. Serial No. 127,809.

In the use of conduit fittings it is very frequently desirable to reduce the size of the opening of the fitting so as to connect it with a smaller conduit than the opening to the fitting. The present invention is designed to accomplish this purpose with relation to fittings designed for use with threadless conduits. Features and details of the invention will appear from the specification and claims.

The invention is illustrated in the accompanying drawings as follows:—

Figure 1:
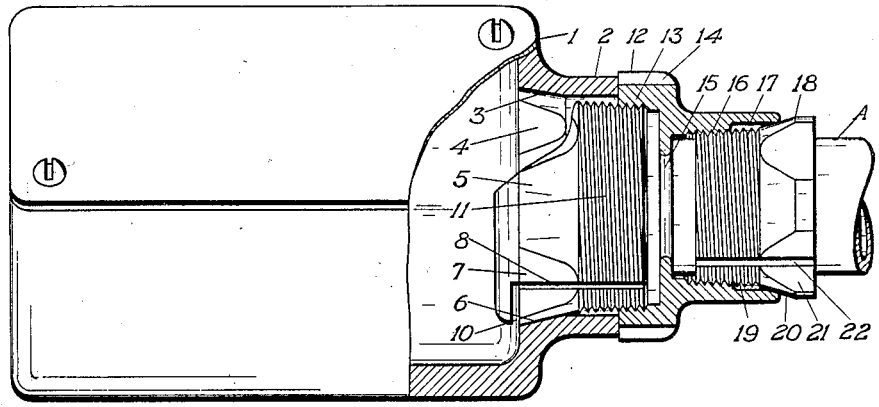

Fig. 1 shows an elevation, partly in section, in a diagonal plane relatively to the fitting.

Figure 2:
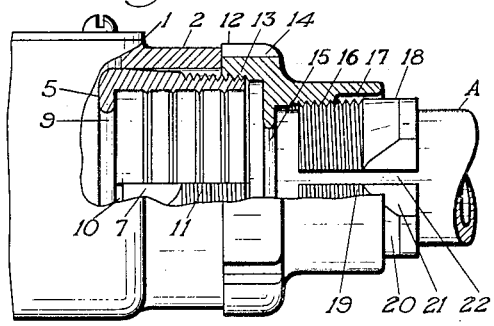

Fig. 2 a similar view, partly in section, on a vertical plane.

Figure 3:
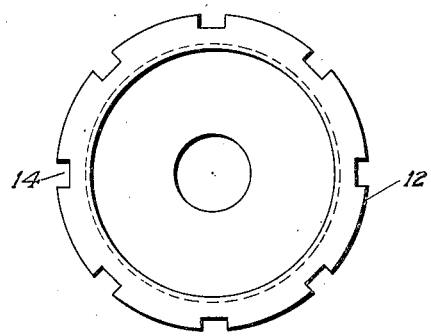

Fig. 3 an end view of the reducing member.

Figure 4:
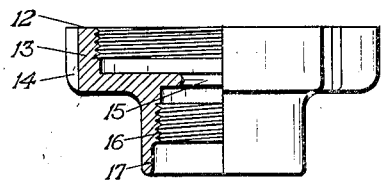

Fig. 4 an elevation of the reducing member, partly in section.

Fig. 5 an elevation of an alternative construction, the figure being partly in section on a diagonal plane through the fitting.

Fig. 6 a similar view, the section being in a vertical plane.

Fig. 7 an end view of the reducing member shown in Figs. 5 and 6.

Fig. 8 an elevation of said reducing member, partly in section.

1 marks the fitting body. As shown this is in the form of a conduit box but the invention is not limited to such a specific fitting. The body has an extension 2 with an inner tapered surface 3, the surface being provided with flats, or out of round portions 4.

A contractible sleeve 5 is arranged in the extension. It has a tapered portion 6 adapted to operate in wedging engagement against the surface 3. The sleeve is also provided with flats 7 corresponding to the flats 4 to prevent the sleeve from turning. It has a longitudinal slit 8 rendering it contractible. An inner continuous guard lip 9 is separated from the body of the sleeve by a circumferential slot 10 extending from a longitudinal slot. It will be readily observed that when this sleeve is drawn into the fitting it is contracted to engage a threadless conduit in the manner illustrated and described in the application of Howard A. Selah, #23,348, filed Apr. 15th, 1925, issued as Patent No. 1,683,413, dated Sept. 4, 1928. The sleeve has the external screw threads 11 at its outer end.

A reducing member 12 has an internally screw-threaded flange 13 adapted to screw on to the end of the sleeve 5 and against the end of the extension to draw the sleeve into clamping engagement in the extension. The reducer has a wrench-hold periphery 14 through which it may be readily engaged to turn it to place. It is also provided with a conduit guard lip 15 toward its inner end and is also provided with an internal screw thread 16 near its inner end and an unthreaded annular wedging portion 17 at its outer end.

A contractible sleeve 18 has an inner screw threaded portion 19, an intermediate unthreaded wedge portion 20 and an outer wrench-hold 21. It is provided with a longitudinal slot 22 rendering the sleeve contractible and is shown as engaging a conduit A. By screwing the sleeve into the reducing member the unthreaded portions operating through wedging engagement contract the sleeve into wedging engagement with the conduit. Thus the reduction is accomplished using the standard fitting except as to the reducing member, the contractible sleeve forming a part of the conduit fitting illustrated in the application of Howard A. Selah, No. 54,775, filed Sept. 5th, 1925, issued as Patent No. 1,606,188 dated Nov. 9, 1926.

In the alternative construction of Figs. 6, 7 and 8 the reducing member is similar to that shown in Figs. 1 to 4 except that the guard lip 15 is omitted from the reducing member 12a and the contracting sleeve 18a corresponding to the sleeve 18 is provided with a guard lip 23, the guard lip being separated from the body of the sleeve by a circumferential slot 24 extending from the longitudinal slot.

What I claim as new is:—

1. In a conduit fitting, the combination of a body having an extension thereon with a conduit receiving opening; a contractible sleeve in the opening having a flaring inner end adapted to engage with wedging contact in the extension, said sleeve being slotted and having external threads at its outer end; a reducing member screwed on to the outer end of the sleeve and drawing it into clamping engagement with the opening; and means for securing a conduit in the reducing member.

2. In a conduit fitting, the combination of a body having an extension thereon with a conduit receiving opening; a contractible sleeve in the opening having a flaring inner end adapted to engage with wedging contact in the extension, said sleeve being slotted and having external threads at its outer end; a reducing member screwed on to the outer end of the sleeve and drawing it into clamping engagement with the opening; and means for securing a conduit in the reducing member comprising a slotted contractible sleeve coacting with the reducing member for contracting the sleeve into clamping engagement with an inserted conduit.

In testimony whereof I have hereunto set my hand.

ELMER J. S. SWANSON.